United States Patent
Choudhary et al.

(10) Patent No.: US 10,318,489 B2
(45) Date of Patent: Jun. 11, 2019

(54) AVOIDING FULL FILE REPLICATION USING SPARSE FILES

(71) Applicant: VMware, Inc., Palo Alto, CA (US)

(72) Inventors: Jairam Choudhary, Sunnyvale, CA (US); Matthew Conover, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 395 days.

(21) Appl. No.: 14/695,482

(22) Filed: Apr. 24, 2015

(65) Prior Publication Data

US 2015/0339317 A1    Nov. 26, 2015

Related U.S. Application Data

(60) Provisional application No. 62/001,142, filed on May 21, 2014.

(51) Int. Cl.
  *G06F 16/11*    (2019.01)
  *G06F 16/178*    (2019.01)
  *G06F 16/18*    (2019.01)

(52) U.S. Cl.
  CPC .......... *G06F 16/178* (2019.01); *G06F 16/181* (2019.01)

(58) Field of Classification Search
  CPC ......... G06F 17/30174; G06F 17/30188; G06F 16/178
  USPC .......................................................... 707/625
  See application file for complete search history.

(56) References Cited

U.S. PATENT DOCUMENTS

| 5,644,782 | A | 7/1997 | Yeates et al. | |
|---|---|---|---|---|
| 6,477,544 | B1 | 11/2002 | Bolosky et al. | |
| 7,587,563 | B1* | 9/2009 | Teterin | G06F 11/1435 711/161 |
| 7,831,639 | B1* | 11/2010 | Panchbudhe | G06F 17/30067 707/816 |
| 8,825,936 | B2 | 9/2014 | Wade et al. | |
| 9,411,821 | B1* | 8/2016 | Patwardhan | G06F 17/30227 |
| 9,665,583 | B1* | 5/2017 | VonThenen | G06F 17/30091 |
| 2005/0065986 | A1* | 3/2005 | Bixby | G06F 17/30088 |
| 2006/0179261 | A1 | 8/2006 | Rajan | |
| 2010/0250493 | A1* | 9/2010 | Adkins | G06F 17/30088 707/639 |

FOREIGN PATENT DOCUMENTS

WO    2004102326 A2    11/2004

* cited by examiner

*Primary Examiner* — Jensen Hu

(57) ABSTRACT

Examples disclosed herein provide systems, methods, and software for avoiding data replication using sparse files. In one example, a method of using a sparse file to manage modifications to read-only files includes identifying an open file request on a computing system for a read-only file, and generating the sparse file corresponding to the read-only file. The method further includes identifying a modification to the read-only file and, responsive to identifying the modification, initiate a write to the sparse file based on the modification and identifying the write in a region map.

18 Claims, 8 Drawing Sheets

AVOIDING FULL FILE REPLICATION USING SPARSE FILES

RELATED APPLICATIONS

This application is related to and claims priority to U.S. Provisional Patent Application No. 62/001,142, entitled "AVOIDING FULL FILE REPLICATION USING SPARSE FILES," filed on May 21, 2014, and which is hereby incorporated by reference in its entirety.

TECHNICAL BACKGROUND

In some computing systems, users may require large files, such as databases, text files, HyperText Markup Language (HTML) files, images, and the like. These files, which may be classified as read-only when accessed by a plurality of users, may require duplication when each of the read-only users require a modification to the original file. Thus, rather than having a single file stored for the plurality of users, one or more duplicate files may be generated for each of the users, allowing the users to edit the original file as they deem necessary. However, as each of the users requires a copy of the original file, storage space for the computing system may suffer, as data is duplicated one or more times from the original file.

In addition to traditional files such as the text, database, and HTML files stated above, some computing systems and file systems may process sparse files. A sparse file is a type of computer file that attempts to use file system space more efficiently while the file itself is mostly empty. This is achieved by writing brief information or metadata representing the empty blocks in the file to disk instead of the actual "empty" space that makes up the block. Accordingly, only portions of the file that include data would need to be written to the storage device, saving space on the disk and processing resources to write all of the blocks for the file.

OVERVIEW

Examples disclosed herein provide enhancements for avoiding data replication using sparse files. In one example, a method of using a sparse file to manage modifications to read-only files includes identifying an open file request on a computing system for a read-only file, and generating the sparse file corresponding to the read-only file. The method further includes identifying a modification to the read-only file and, responsive to identifying the modification, initiate a write to the sparse file based on the modification and identifying the write in a region map.

In another example, an apparatus to manage modifications to read-only files includes one or more non-transitory computer readable media. The apparatus further includes processing instructions stored on the one or more non-transitory computer readable that, when executed by processing circuitry, direct the processing circuitry to identify an open file request on a computing system for a read-only file. The processing instructions further direct the processing circuitry to generate a sparse file corresponding to the read-only file, and identify a modification to the read-only file. The processing instructions also direct the processing circuitry to, in response to identifying the modification, initiate a write to the sparse file based on the modification and identifying the write in a region map.

In a further example, a system to manage modifications to read-only files includes one or more read-only volumes that store read-only files accessible by a plurality of users, and one or more writable volumes associated with a first user of the plurality of users. The system further includes an interpret module configured to, in response to an open file request from the first user on a computing system for a read-only file stored on the one or more read-only volumes, generate a sparse file in the one or more writable volumes corresponding to the read-only file. The interpret module is also configured to identify a modification to the read-only file and, in response to identifying the modification, initiate a write to the sparse file based on the modification and identifying the write in a region map.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
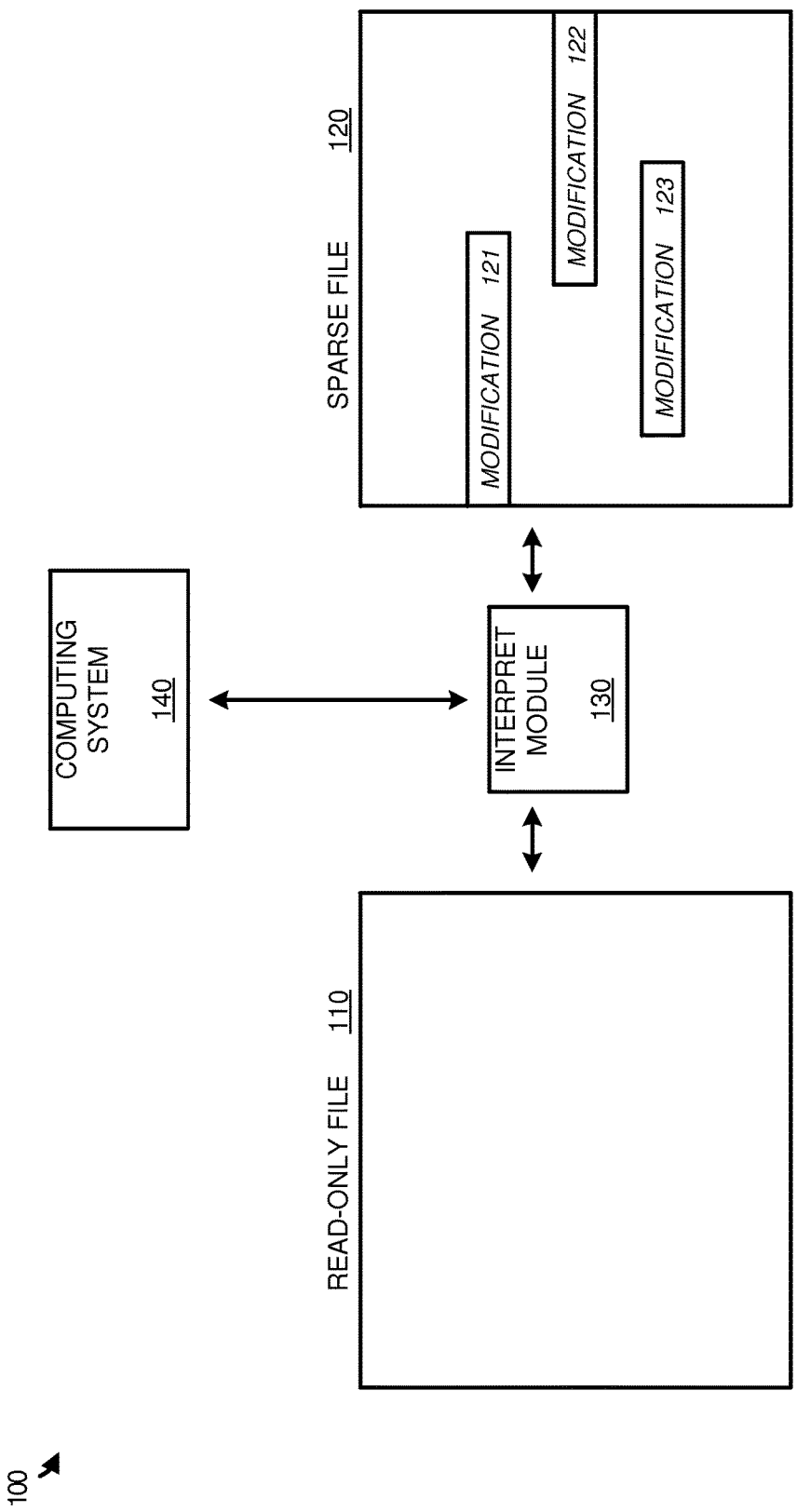
FIG. 1 illustrates an operational scenario for avoiding data replication using sparse files.

Physical and virtual computing systems require files to accomplish various tasks, including data analysis, image editing, and other similar operations. In some examples, an administrator or some other management system may dictate the permissions of these files to prevent improper modifications, or changes to a file that is accessed by a plurality of users. Accordingly, a user may be able to access the file, or read in the file, but may not make any changes to the data within the file.

In the present example, various files may be identified as read-only and accessed by one or more users on one or more computing systems. Responsive to a request to open a file, a sparse file is generated that corresponds to the original read-only file. This sparse file is used to manage modifications to the read-only file by the particular computing system, allowing the user or system to edit the file without changing the file for other users or computing systems. Once changes are made to the file, an interpreter or driver may be used to direct data reads to the appropriate file. Thus, if a read is necessary from an unmodified portion of the read-only file, then the read-only file will be used to provide the data. In contrast, if a read is necessary for a modified portion of the file, the interpreter or driver may direct the data read to a particular portion of the sparse file responsible for the modified portion.

In some examples, the sparse file may be generated using the file system of the computing system, resulting in a single sparse file that uses metadata to represent "empty" space within the file. In other instances, where the file system does not support the use of sparse files, a set of one or more smaller files may be used to represent subsections of the read-only file and together act as the single sparse file. Thus, if a read-only file is one gigabyte in size, but only the first one-kilobyte has been initialized or modified; the on-disk representation of this sparse file would only be around one-kilobyte of storage using a single sparse file or the plurality of smaller files.

In some occurrences, an organization may initiate a plurality of virtual machines across a plurality of host computing devices as part of a service. This service may allocate the virtual machines to one or more users, allowing the users to access particular applications, and storage volumes containing files and directories for the user. To access the one or more virtual machines, remote computing devices, such as desktop computers, laptop computers, smartphones, tablets, and the like, may remotely login or access the virtual machines using the internet or other similar communication networks. Based on the login credentials of the user, specific application and data volumes may be presented or mounted to the virtual machine for the user. These volumes may include writable volumes that allow the user to modify and add data to the volume, as well as read-only volumes that allow the user to view, but not modify, the contents of the files within the volume. Accordingly, in the present example, when the user attempts to modify a read-only file, a sparse file is generated in the writable volume that allows the user to make the requested modifications.

To further illustrate the avoiding of replication using a sparse file, FIG. 1 is included. FIG. 1 illustrates an operational scenario 100 for avoiding data replication using sparse files. Operational scenario 100 includes read-only file 110, sparse file 120, interpret or driver module 130, and computing system 140. Although illustrated as a separate module in the present example, it should be understood that interpret module 130 may reside wholly or partially within computing system 140.

In operation, computing system 140 may require various files and directories to operate and execute desired tasks. The files may include the components necessary to execute an application, as well as the end target files, such as databases, text documents, HyperText Markup Language (HTML) files, or other data objects that are used within the applications. In some examples, especially in instances where multiple users or computing devices have access to the files, an administrator or some other management process might designate important files as read-only. As a result, the files that are read into the computing system may not be manipulated, as they are necessary for other users and devices.

In the present example, computing system 140 requests to open read-only file 140. Responsive to the request, a corresponding delta sparse file 120 is generated to handle any modifications or writes to read-only file 110. Sparse file 120 may be configured to be equivalent in size to read-only file 110, making enough room for any modifications or writes to the file. Here, computing system 140 attempts to make modifications 121-123 to read-only file 110. Rather than writing these changes to the read-only file, interpret module 130 identifies the modifications and writes the modifications to sparse file 120. Accordingly, read-only file 110 may remain unchanged, while sparse file 120 reflects the desired changes for the end user of computing system 140.

For example, read-only file 110 may comprise a large database or spreadsheet that contains a large amount of data, and can be accessed by multiple users and computing devices. As a result, when computing system 140 opens the file and makes changes to a row or column of the database, the changes are reflected within sparse file 120. Thus, if computing system 140 requires a read from the file, interpret module 130 identifies if it is a modified or unmodified portion and delivers the data accordingly. An unchanged row or column in the database will be delivered from read-only file 110, and the modified portions will be delivered from sparse file 120.

Figure 2:
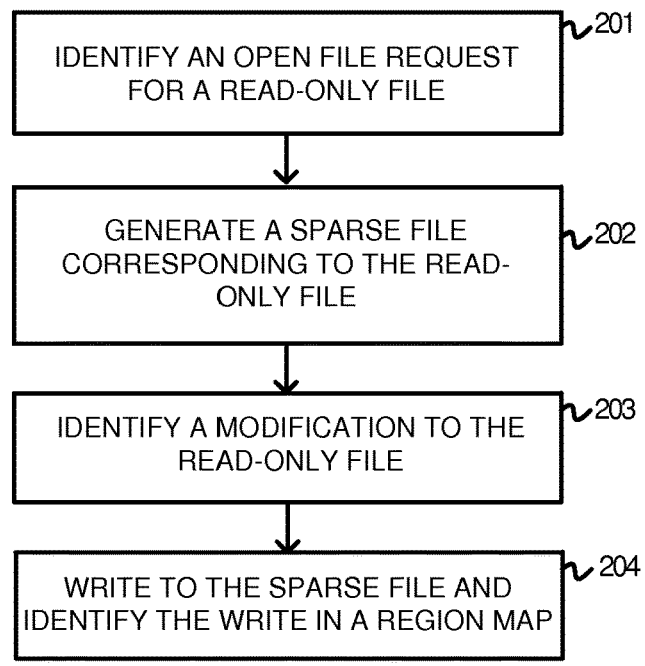
FIG. 2 illustrates a method for avoiding data replication using sparse files.

To further illustrate the operation of creating sparse files for file open requests, FIG. 2 is provided. FIG. 2 illustrates a method for avoiding data replication using sparse files. The operations of FIG. 2 are referenced parenthetically in the description below.

In operation, a computing device may have access to read-only and writable storage. The read-only portion of storage allows the computing device to read in a data file, but does not allow a user or other process on the device to modify the data. In contrast, the writable storage volumes allow the device to both read in data and modify the data as needed. Thus, the data that is initially read may be written over as changes are made.

In the present example, an administrator or some other management process may dictate that files are read-only to prevent changes by the one or more users that have access to the files. As a result, the method for avoiding data replication and allowing user changes includes identifying an open file request for a read-only file by a computing system (201). Responsive to the request, the method includes generating a sparse file corresponding to the read-only file (202). In some examples, where the file system includes the ability to process sparse files, a sparse file may be generated that is equivalent in size using the sparse metadata to the read-only file. Once the file is generated, the method includes identifying a modification to the read-only file (203), and writing the modification to the sparse file while identifying the modification in a region map (204). This region map may comprise a separate file that can be used by the computing system to direct read and writes between the read-only file and the generated sparse file.

For example, referring back to FIG. 1, computing system 140 may initiate a file open request to read-only file 110. In response to the open request, sparse file 120 is generated that is equal in size to read-only file 110. Once generated, writes or modifications 121-123 are made to read-only file 110, and interpret module 130 makes the modifications in sparse file 120. Further, because the changes are reflected in a file separate from read-only file 110, interpret module 130 identifies where a change was made to the read-only file and directs later read requests to the sparse file when necessary.

Although illustrated in the previous example as using a single sparse file to handle modifications to the read-only file, it should be understood that some file systems might be incapable of processing sparse files. Thus, rather than generating a single sparse file, a plurality of small files may be used as the sparse file to manage the modifications to the read-only-file. For example, each of modifications 121-123 may be maintained within a separate file within the writable volume, and interpret module may use these separate files to present the modified version of read-only file 110 to computing system 140.

Figure 3:
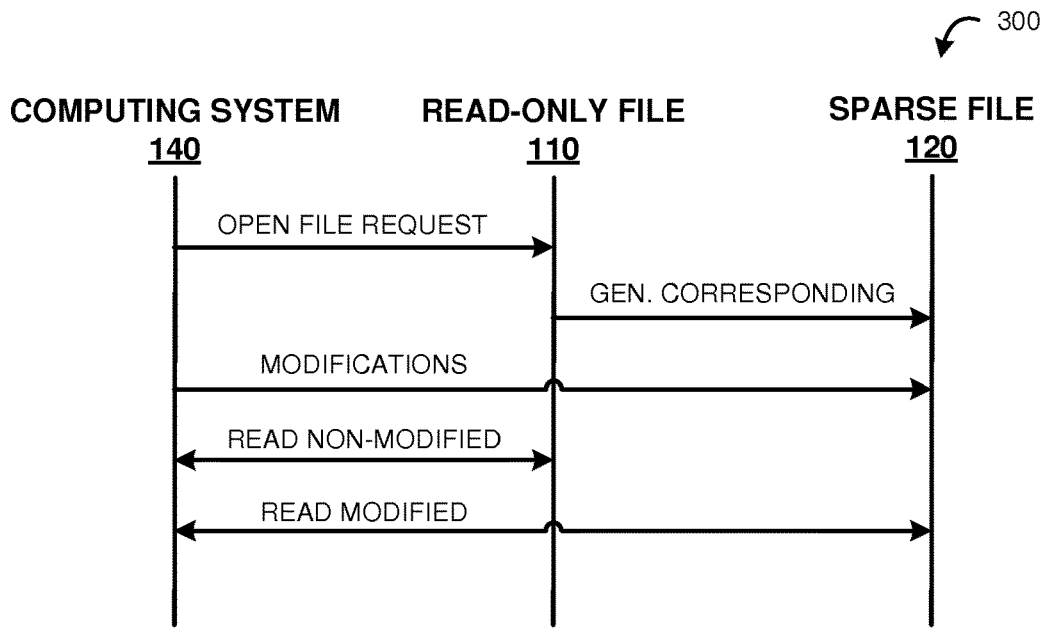
FIG. 3 illustrates a timing diagram for avoiding data replication using sparse files.

As a further illustration of the duplication of read-only files, FIG. 3 is included. FIG. 3 illustrates a timing diagram 300 for avoiding replication using sparse files. As depicted, computing system 140 initiates an open file request of read-only file 110. Responsive to the request, sparse file 120 is generated that corresponds to read-only file 110. This sparse file does not copy over the data from read-only file 110, but is rather left empty for future modifications or writes from computing system 140. As a result, as modifications are made to the read-only file, the writes are directed to sparse file 120 and a region map is maintained to keep track of each of the changes. Further, as computing system 140 requires reads from the file after modifications are made, non-modified reads are directed to read-only file 110 that contains the original data, and any modified read is directed to sparse file 120 that contains the modified data. This directing of the reads may, in some examples, be directed by interpret module or driver 130 that may be executed wholly or partially within computing system 140.

Figure 4:
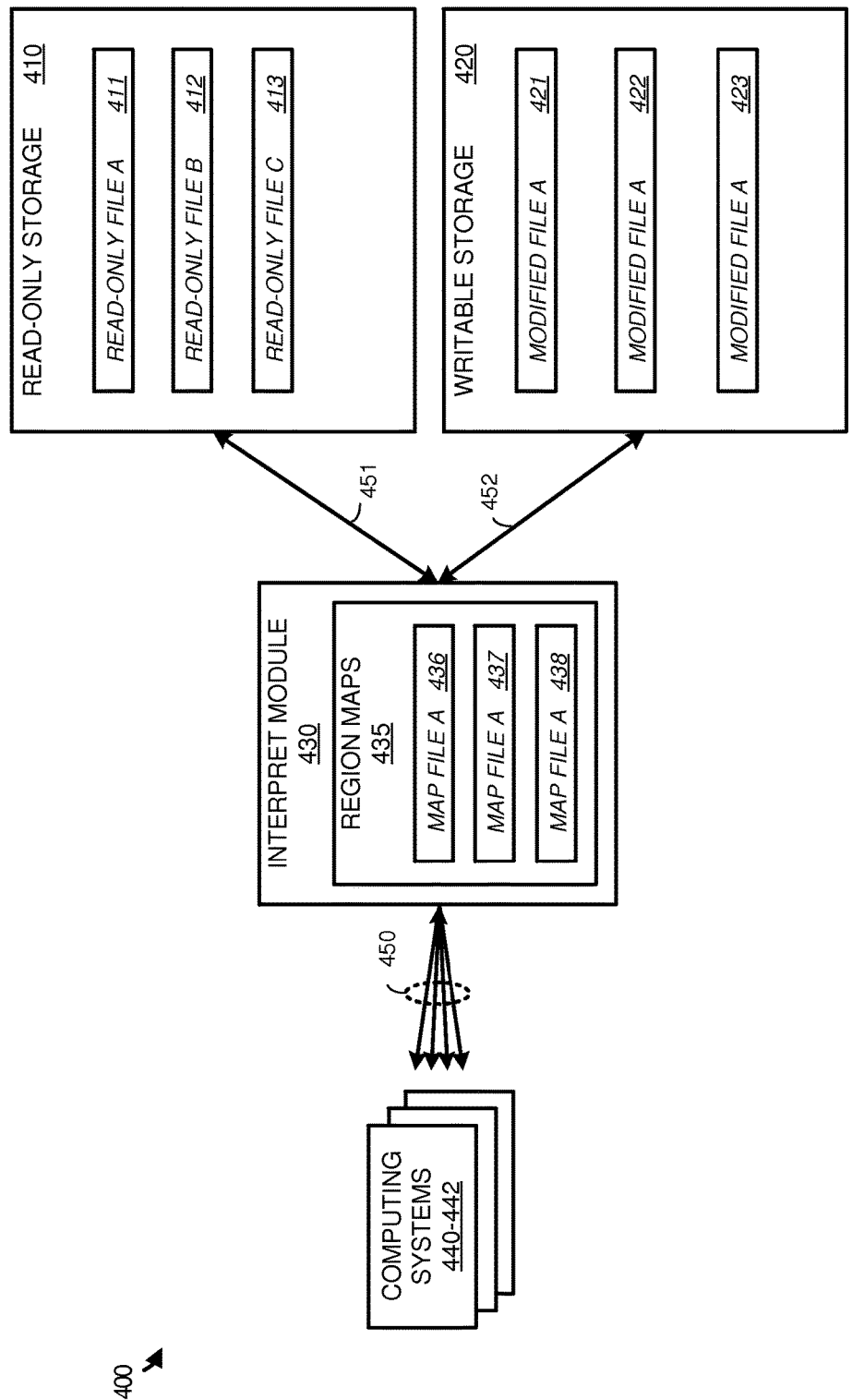
FIG. 4 illustrates a system for avoiding data replication using sparse files.

Turning to FIG. 4, FIG. 4 illustrates a system 400 for avoiding replication using sparse files. System 400 includes read-only storage 410, writable storage 420, interpret module 430, and computing system 440-442. Computing systems 440-442 communicate with interpret module 430 over communication links 450, and interpret module 430 further communicates with read-only storage 410 and writable storage 420 using communication links 451-452. Interpret module 430 further includes region maps 435, which comprises mapping files for file A 436-438. Read-only storage 410 further includes read-only files A through C 411-413, and writable storage 420 further includes modified A files 421-423.

In operation, computing systems 440-442 may execute for one or more users and provide the users with various files necessary for tasks on the devices. In some examples, computing systems 440-442 may share various storage volumes and storage elements that contain files, directories, and keys for execution by the various devices. Accordingly, an administrator or some other management system may desire to restrict the access of the various users to read-only status, preventing the users from changing files that are accessed by other users or computing systems.

In the present example, computing systems 440-442 have access to multiple read-only files 411-413. When the users open a file, such as read-only file A 411, a corresponding sparse file is generated in writable storage 420 to allow the user to manipulate the read-only file without causing issues for the other users. For instance, if each computing system of computing system 440-442 initiated an open of read-only file A 411, then each computing system would generate a separate sparse file A 421-423 that is associated with the device. These sparse files may appear equivalent in size, but do not contain the same data as the read-only counterparts. Instead, the files are left empty to account for changes or modifications to the read-only file.

For instance, if a computing system in computing systems 440-442 modified read-only file A 411, a change would be made to the corresponding sparse file A in writable storage 420. In addition, to identify each of the changes, a region map in region maps 435 may indicate that there has been a change to a particular portion of the file. This allows future read requests to be processed by interpret module 430 to determine which data should be passed to the end computing system. Any read request from a computing device for non-modified data will be directed to the read-only files 411-413. In contrast, if a computing system requires a modified portion of the file, the data will be directed from the appropriate sparse file of sparse files 421-423.

In at least one example, the sparse files may be used to monitor deltas or modifications to read only files at an operating system level. For instance, operating system instances across computing system 440-442 may be clones of one another. Accordingly, to monitor the changes that are made to the operating system on each computing system, the modifications may be managed through a sparse delta file to maintain the original clones of the operating system.

Although three computing systems are illustrated in the present example, it should be understood that any number of computing systems might communicate with read-only storage 410 and writable storage 420. Further although illustrated as a separate module in the present example, it should be understood that interpret module 430 may reside wholly or partially on computing systems 440-442.

Returning to the elements of system 400, computing system 440-442 may include a physical or virtual computing device capable of requesting files from read-only storage 410 and writable storage 420. Computing systems 440-442 may include physical or virtual processing systems, storage systems, communication interfaces, and user interfaces. In some examples, computing system 440-442 may include multiple users that each has access to all or portions of read-only storage 410.

Interpret module 430 may include one or more physical or virtual computing systems capable of handling the read and write requests. Interpret module 430 may include physical or virtual processing systems, storage systems, communication interfaces, and user interfaces. Although illustrated separately, it should be understood that interpret module 430 may reside wholly or partially as a module on computing systems 440-442.

Read-only storage 410 and writable storage 420 may include any storage medium capable of storing files for computing systems 440-442. Read-only storage 410 and writable storage 420 may include disk drives, solid state drives, virtual hard disks (VHDs), virtual machine disks (VMDKs), data storage circuitry, or some other memory apparatus. Although illustrated in the present example with three files, it should be understood that read-only storage 410 and writable storage 420 might include any number of files as well as other types of data.

Communication links 450-452 use metal, glass, optical, air, space, or some other material as the transport media. Communication links 450-452 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 450-452 can each be a direct link or can include intermediate networks, systems, or devices, and can include a logical network link transported over multiple physical links. Although one main link is shown for each of links 450-452 in FIG. 4, it should be understood that links 450-452 are merely illustrative to show communication modes or access pathways.

Figure 5:
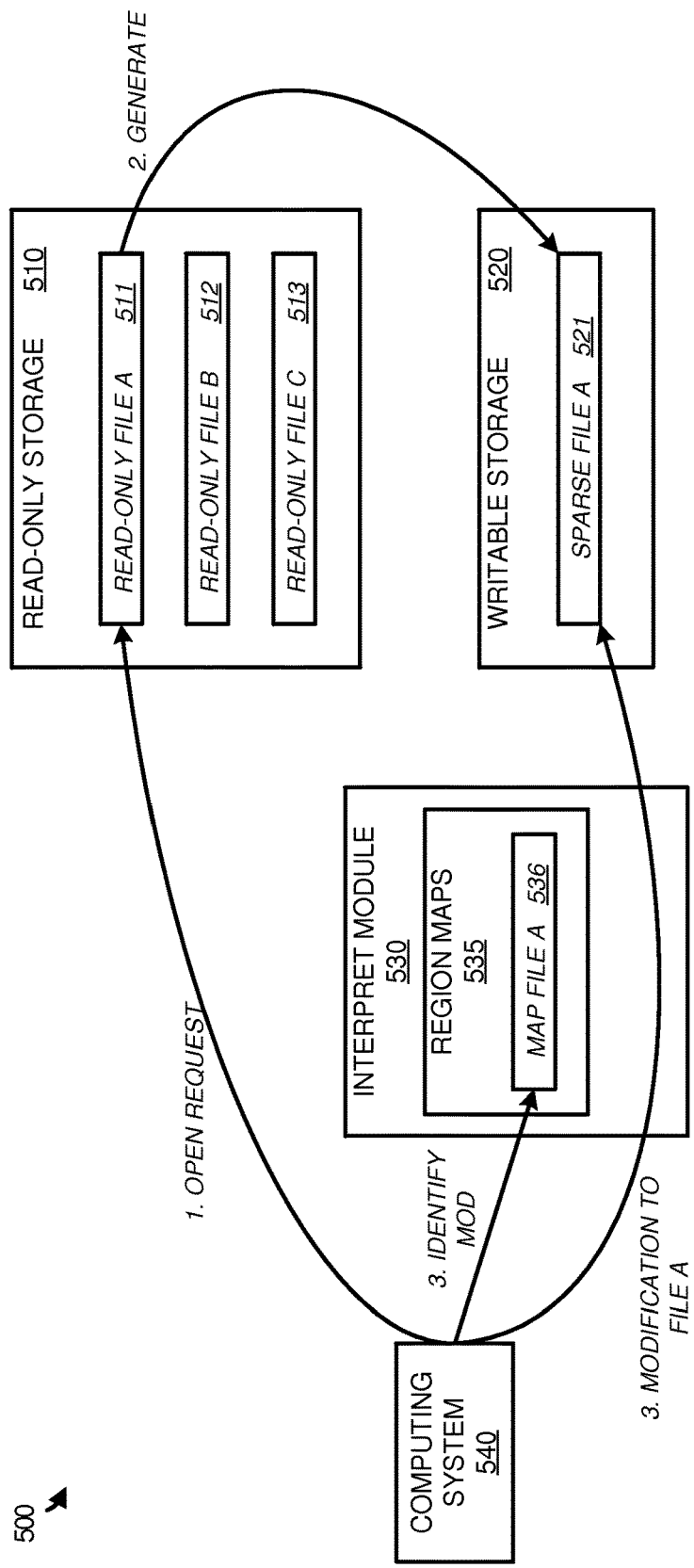
FIG. 5 illustrates an overview of generating and writing to a sparse file that corresponds to a read-only file.

Referring to FIG. 5, FIG. 5 illustrates an overview 500 of generating and writing to a sparse file that corresponds to a read-only file. Overview 500 includes read-only storage 510, writable storage 520, interpret module 530, and computing system 540. Read-only storage 510 further includes read-only files 511-513, writable storage 520 further includes sparse file 521, and interpret module 530 further includes region maps 535.

In operation, computing system 540 may have access to a variety of files that are both locally stored on the computing system, or stored externally. These files may be given various permissions, such as read-only, based on the requirements of multiple users within the system. In the present example, computing system 540 has access to read-only storage 510 and writable storage 520. When the user of computing system 540 attempts to access a file in read-only storage 510, a sparse file is generated that corresponds to the read-only file. For instance, referring to overview 500, computing system 540 initiates a read request for read-only file A 511. Responsive to the request, the data for the file is provided to computing system 540, and sparse file 521 is generated in writable storage 520. This sparse file may be used by the computing system 540 to make changes to the read-only file without making a complete copy of initial file.

For example, as a modification is made to read-only file A 511, interpret module 530 is configured to direct the modification to be made to sparse file A 521. At the same time, interpret module 530 manages region maps 535 that are used to identify the changes for future reads. As a result, any modification that is made to sparse file A 521 is registered or marked in map file A 536, such that future read requests to the modifies portion of the file would be read from sparse file A 521 instead of read-only file A 511.

As an illustrative example, read-only file A 511 may be a large database or spreadsheet that requires a large amount of data. If a user would like to replace a row within the spreadsheet, the row modification is to be reflected in the sparse volume, while record of the modification is to be stored in the map associated with the computing device (or user of the device) and the file.

Figure 6:
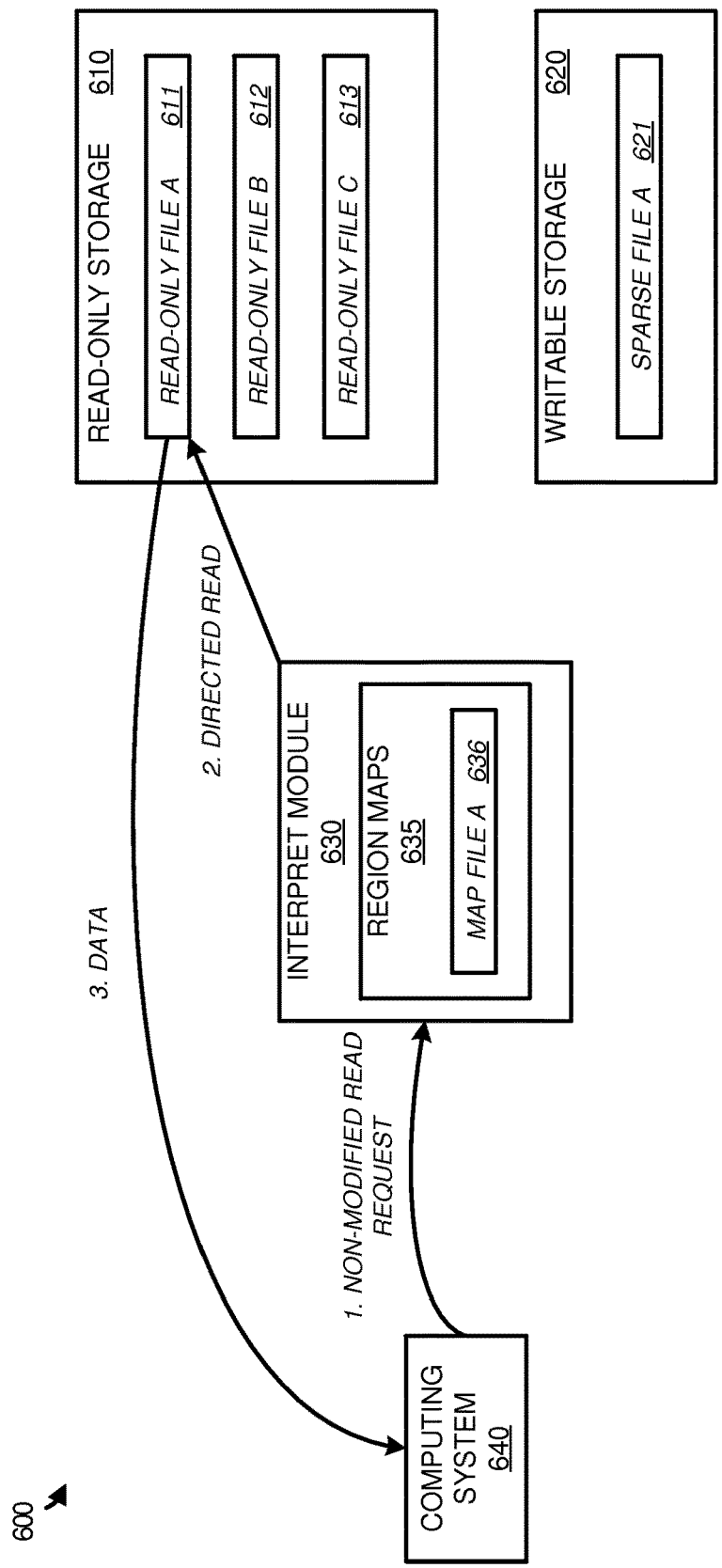
FIG. 6 illustrates an overview of making a non-modified read request to a read-only file.

To further illustrate the read process once a modification is made to a read-only file, FIG. 6 is included. FIG. 6 illustrates an overview 600 of making a non-modified read request to a read-only file. Overview 600 includes read-only storage 610, writable storage 620, interpret module 630, and computing system 640. Read-only storage 610 further includes read-only files 611-613, writable storage 620 further includes sparse file 621, and interpret module 630 further includes region maps 635.

As illustrated, sparse file A 621 is generated that corresponds to computing system 640 and read-only file A 611. This sparse file is used to store modifications made to read-only file A 611 by computing system 640, but does not store all of the data for read-only file A 611. Accordingly, as a user or some other process on computing system 640 makes a read request for non-modified data, interpret module 630 is configured to direct the request to read-only storage 610, which will return the appropriate data for the computing system. To manage the directing of the data requests, interpret module 630 includes region maps 635 and map for file A 636. Region maps 635 are used to identify portions of data that have been modified to direct requests to read-only storage 610 and writable storage 620. For instance, if a request is for non-modified data, then the request will be forwarded to read-only storage 610, whereas if the request is for modified data, the request will be forwarded to writable storage 620 and the corresponding sparse file. Region maps 635 may comprise tables, linked lists, trees, or some other type of data structure that is capable of mapping requests for modified data to the appropriate storage location and sparse file.

Figure 7:
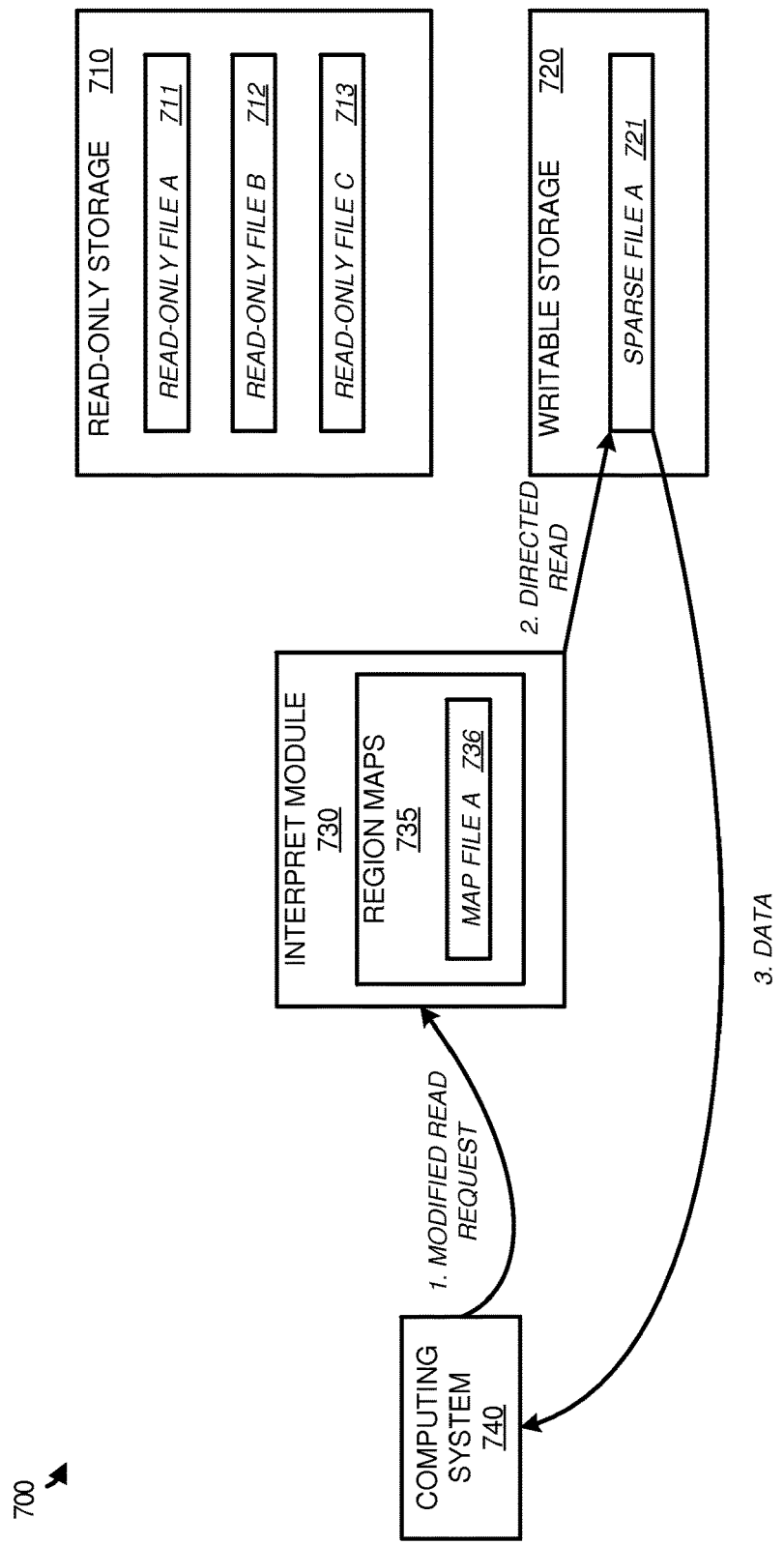
FIG. 7 illustrates an overview of making a modified read request to a read-only file.

Turning to FIG. 7, FIG. 7 illustrates an overview 700 of making a modified read request to a read-only file. Overview 700 includes read-only storage 710, writable storage 720, interpret module 730, and computing system 740. Read-only storage 710 further includes read-only files 711-713, writable storage 720 further includes sparse file 721, and interpret module 730 further includes region maps 735.

Similar to FIG. 6, sparse file A 721 corresponds to read-only file A 711 to allow computing system 740 to make changes to the read-only file. Accordingly, when computing system 740 requires a read from the current version of the file, interpret module 730 may be required to make a determination of the location of the read. To accomplish this task, interpret module 730 maintains region maps 735 that include location information for modifications to the read-only files. For example, if read-only file A 711 were a spreadsheet that were manipulated by computing system 740, map file A 736 could maintain information about the rows and columns that were modified by the computing system. As a result, when a modified read request is made by computing system 740, interpret module 730 may determine whether the request should be directed to read-only storage 710, or writable storage 720. In the present instance, because a request for a modified portion is identified by interpret module 730, the read request is directed to writable storage 720, which provides the modified data to computing system 740.

Figure 8:
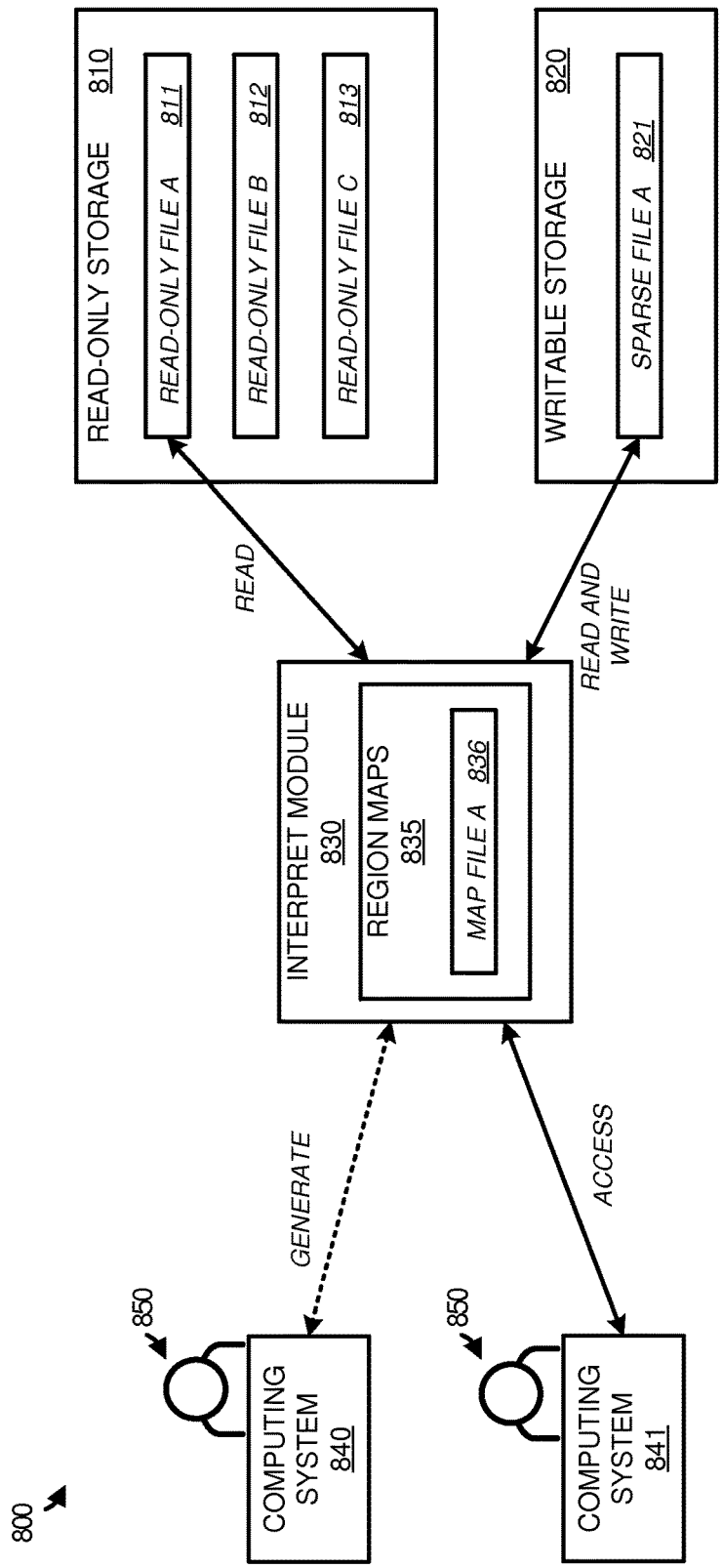
FIG. 8 illustrates an operational scenario for avoiding data replication using sparse files.

Turning to FIG. 8, FIG. 8 illustrates an operational 800 scenario for avoiding data replication using sparse files. Operational scenario 800 includes read-only storage 810, writable storage 820, interpret module 830, computing systems 840-841, and user 850. Computing system 840-841 are examples of virtual machines that execute via one or more hypervisors and host computing systems. Read-only storage 810 further includes read-only files 811-813, writable storage 820 further includes sparse file 821, and interpret module 830 further includes region maps 835.

In operation, user 850 may login via a username, password, or other credential information to computing system 840 to accomplish various desired tasks. Computing system 840 may identify the credential information and provide the user with various read-only and writable volumes containing data necessary for the end user. In the present example, the volumes that are attached or mounted to the computing system include read-only storage 810, and writable storage 820.

As illustrated herein, user 850 requires read-only file 811 from read-only storage 810. Responsive to the user request for the file, sparse file 821 is generated to maintain the changes to read-only file 811. Similarly, map file 836 is also generated in region maps 835 to record the differences between the original read-only file and the file that is being modified by user 850. For example, if the user were to delete a row in a database, sparse file 821 would record the change, and map file 836 would direct future reads of the changed data to sparse file 821.

Here, once the user logs off of computing system 840, map file 836 and sparse file 821 are preserved. Accordingly, when user 850 logs in on computing system 841, the same volumes may be attached as when the user was using computing system 840. By maintaining the modified files, when user 850 requires read-only file 811 on computing system 840, the user may be provided with the modified version via the assistance of interpret module 830. For instance, if the user requested an unchanged portion of read-only file 811, interpret module 830 may provide computing system 841 with data from read-only storage 810. In contrast, if user 850 requested modified data, interpret module 830 may direct the request to sparse file 821 based on the information in map file 836. Accordingly, rather than duplicating a read-only file multiple times for each user that requires access, sparse files may be maintained that reduce the amount of storage required for each of the individual users.

Although illustrated as external to computing systems 840-841, it should be understood that interpret module 830 may reside wholly or partially in computing systems 840-841. Further, in some instances, interpret module 830 may reside wholly or partially in the hypervisor or hosts to computing systems 840-841. Although not illustrated herein, it should be understood that map file 836 might comprise a table, an array, or any other similar data structure capable of directing file inquiries between the read-only file and the users writable delta file.

Figure 9:
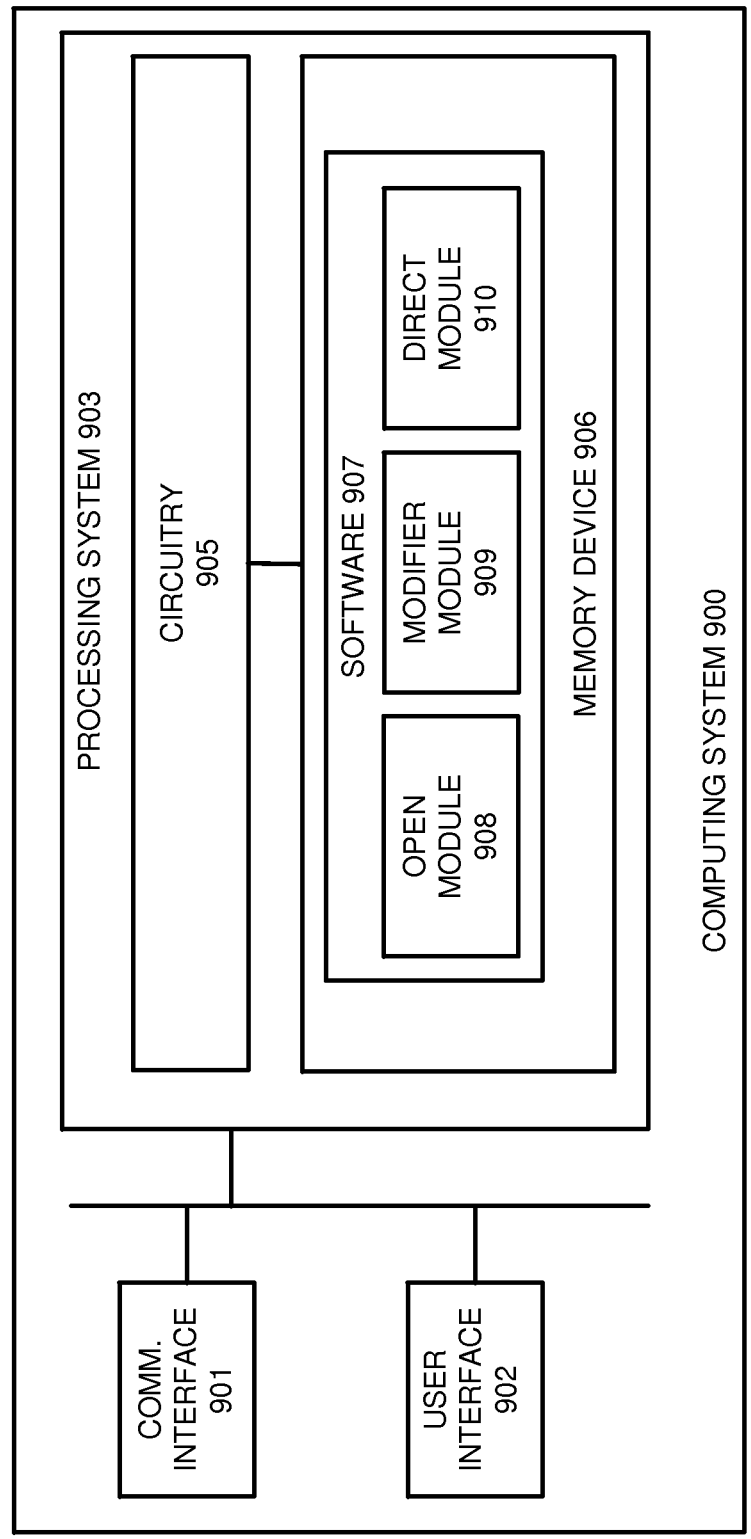
FIG. 9 illustrates an interpreting computing system for avoiding replication using sparse files.

Referring now to FIG. 9, FIG. 9 illustrates a computing system 900 for avoiding data replication using sparse files. Computing system 900 is representative of a computing system that may be employed in any computing apparatus, system, or device, or collections thereof, to suitably implement the generation and management of sparse files to accommodate modifications to read-only files as described herein. Computing system 900 is an example of interpret module 130, 430, 530, 630, 730, and 830, although other examples may exist. Computing system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof. Communication interface 901 may be configured to communicate with various storage, including read-only storage and writable storage, that provide one or more computing devices and users access to the files that are stored thereon.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes open module 908, modifier module 909, and direct module 910. Operating software 907 may further include an operating system, utilities, drivers, network interfaces, applications, or some other type of software. When executed by processing circuitry 905, operating software 907 directs processing system 903 to operate computing system 900 as described herein.

In particular, open module 908 is configured to identify a request to open a read-only file from a computing device, and generate an empty sparse file to account for modifications to the read-only file. As the computing device interacts with the opened file, changes to the file may be identified by modifier module 909. Once the changes are identified, computing system 900 writes the changes in the corresponding sparse file. Thus, although the original read-only file remains unchanged, the sparse file accounts for changes created by the computing device.

In addition, to making the changes to the sparse file, computing system 900 also maintains a region map to identify areas of the file that are changed in the sparse file. This region map, which may comprise a table, an array, or some other similar data structure, may be used by direct module 910 to direct read requests to the read-only or sparse versions of the file. For instance, using a database as an example, the original read-only file may be large and inefficient to duplicate for each of the computing devices and users that have access to the file. Accordingly, when a read is needed from an unmodified portion of the file, computing system 900 may direct the read to occur from the read-only file. In contrast, if the read is needed from a modified portion of the file, such as a modified portion of the database incurred by the computing device, computing system 900 may direct the read to come from the sparse file.

In a particular example, an organization may execute a plurality of virtual machines via one or more host computing devices. These virtual machines allow various users to remotely login to the virtual machines and gain access to one or more volumes associated with the end user. For instance, when a user logs into the organization, one or more volumes may be identified for the user, and the corresponding volumes attached to the virtual machine. These volumes may include writable volumes associated with just the logged in user, or may comprise read-only volumes that are associated with a plurality of users. Accordingly, when a read-only file is opened from the read-only volumes, a sparse file may also be generated within the users writable volume that allows the user to make modifications to the file. In conjunction with the sparse file, a region map file may be generated to direct file system queries from the virtual machine to the appropriate read-only or writable version of the open file.

Although illustrated in the present example with three software modules, it should be understood that any number of software modules might create the same level of functionality. Further, although described as being separate from the file requesting computing devices, it should be understood that computing system 900 might be an example of a file requesting computing device. Thus, a user or process of computing system 900 may initiate a file open request for a read-only file.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of using a sparse file to manage modifications to read-only files, the method comprising:
    identifying a request by a user of a plurality of users in a virtual machine of a plurality virtual machines to open a read-only file stored in a read-only volume attached to the virtual machine, the read-only file accessible by the plurality of users of the plurality of virtual machines via attachment of the read-only volume to the plurality of virtual machines;
    in response to the request, generating the sparse file corresponding to the read-only file, wherein the sparse file is unique to the user of the virtual machine, and wherein the sparse file is stored in a writable volume attached to the virtual machine and associated with the user;
    identifying a modification to the read-only file; and
    responsive to identifying the modification, initiating a write to the sparse file based on the modification and identifying the write in a region map.

2. The method of claim 1 wherein generating the sparse file corresponding to the read-only file comprises, in a file system for the virtual machine, generating the sparse file corresponding to the read-only file.

3. The method of claim 2 wherein the sparse file comprises an equivalently sized sparse file to the read-only file.

4. The method of claim 1 further comprising: identifying a second modification to the read-only file; and
    responsive to identifying the second modification, initiating a second write to the sparse file based on the second modification and identifying the second write in the region map.

5. The method of claim 1 further comprising:
    identifying a second request by a second user of a second virtual machine to open the read-only file; and
    in response to the second request, generating a second sparse file corresponding to the read-only file, wherein the second sparse file is unique to the second user of the second virtual machine, and wherein the second sparse file is stored in a second writable volume attached to the second virtual machine and associated with the second user.

6. The method of claim 1 wherein the read-only file comprises one of a text file, a database file, an image, or a HyperText Markup Language (HTML) file.

7. The method of claim 1 further comprising:
    identifying a read request for the read-only file; and
    retrieving data for the read request from one of the read-only file or the sparse file based on the region map.

8. The method of claim 1 wherein the read-only file is stored in a read-only volume available to the plurality of users, and wherein the sparse file is stored in a write volume available to the user.

9. An apparatus to manage modifications to read-only files, the apparatus comprising:
    one or more non-transitory computer readable media;
    processing instructions stored on the one or more non-transitory computer readable that, when executed by processing circuitry, direct the processing circuitry to:
    identify a file request on by a user of a plurality of users in a virtual machine of a plurality of virtual machines to open a read-only file stored in a read-only volume attached to the virtual machine, the read-only file accessible by the plurality of users of the plurality of virtual machines via attachment of the read-only volume to the plurality of virtual machines;
    in response to the request, generate a sparse file corresponding to the read-only file, wherein the sparse file is unique to the user of the virtual machine, and wherein the sparse file is stored in a writable volume attached to the virtual machine and associated with the user;
    identify a modification to the read-only file; and
    in response to identifying the modification, initiate a write to the sparse file based on the modification and identifying the write in a region map.

10. The apparatus of claim 9 wherein the processing instructions to generate the sparse file corresponding to the read-only file direct the processing circuitry to, in a file system for the virtual machine, generate the sparse file corresponding to the read-only file.

11. The apparatus of claim 10 wherein the sparse file comprises an equivalently sized sparse file to the read-only file.

12. The apparatus of claim 9 wherein the processing instructions further direct the processing circuitry to:
    identify a second modification to the read-only file; and
    in response to identifying the second modification, initiate a second write to the sparse file based on the second modification and identify the second write in the region map.

13. The apparatus of claim 9 wherein the processing instructions further direct the processing system to:
    identify a second request by a second user of a second virtual machine to open the read-only file; and
    in response to the second request, generate a second sparse file corresponding to the read-only file, wherein the second sparse file is unique to the second user of the second virtual machine, and wherein the second sparse file is stored in a second writable volume attached to the second virtual machine and associated with the second user.

14. The apparatus of claim 9 wherein the read-only file comprises one of a text file, a database file, an image, or a HyperText Markup Language (HTML) file.

15. The apparatus of claim 9 wherein the processing instructions further direct the processing circuitry to:
    identify a read request for the read-only file; and
    retrieve data for the read request from one of the read-only file or the sparse file based on the region map.

16. The apparatus of claim 9 wherein the read-only file is stored in a readonly volume available to the plurality of users, and wherein the sparse file is stored in a write volume available to the user.

17. The apparatus of claim 9 further comprising the processing circuitry.

18. A system to manage modifications to read-only files, the system comprising:
    one or more read-only volumes that store read-only files accessible by a plurality of users on a plurality of virtual machines;
    one or more writable volumes associated with a first user of the plurality of users; and an interpret module configured to:
    in response to a request from the first user on a virtual machine of the plurality of virtual machines to open a read-only file stored on the one or more read-only volumes, generate a sparse file in the one or more writable volumes corresponding to the read-only file, wherein the sparse file is unique to the first user, wherein the one or more read-only volumes and the one or more writable volumes are attached to the virtual machine;
    identify a modification to the read-only file; and in response to identifying the modification, initiate a write to the sparse file based on the modification and identifying the write in a region map.

* * * * *